US010902278B2

(12) United States Patent
Ono et al.

(10) Patent No.: US 10,902,278 B2
(45) Date of Patent: Jan. 26, 2021

(54) IMAGE PROCESSING APPARATUS, IMAGE PROCESSING SYSTEM, COMPUTER PROGRAM PRODUCT, AND IMAGE PROCESSING METHOD (71) Applicants: KABUSHIKI KAISHA TOSHIBA, Tokyo (JP); TOSHIBA SOLUTIONS CORPORATION, Kawasaki (JP)

(72) Inventors: Soichiro Ono, Kawasaki Kanagawa (JP); Tomohisa Suzuki, Mitaka Tokyo (JP); Akio Furuhata, Fuchu Tokyo (JP); Atsuhiro Yoshida, Fuchu Tokyo (JP)

(73) Assignees: KABUSHIKI KAISHA TOSHIBA, Tokyo (JP); TOSHIBA SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 15/460,450

(22) Filed: Mar. 16, 2017

(65) Prior Publication Data
US 2017/0286795 A1 Oct. 5, 2017

(30) Foreign Application Priority Data

Mar. 29, 2016 (JP) ................................. 2016-065759

(51) Int. Cl.
*G06K 9/34* (2006.01)
*G06K 9/00* (2006.01)
*G06K 9/20* (2006.01)

(52) U.S. Cl.
CPC ......... *G06K 9/342* (2013.01); *G06K 9/00456* (2013.01); *G06K 9/00469* (2013.01);
(Continued)

(58) Field of Classification Search
CPC .. G06K 9/342; G06K 9/2054; G06K 9/00469; G06K 9/344; G06K 9/00456; G06K 2209/01; G06K 9/00463
See application file for complete search history.

(56) References Cited

U.S. PATENT DOCUMENTS 6,681,046 B1 * 1/2004 Kashiwagi ......... G06K 9/00449
382/195
2006/0007471 A1 1/2006 Okamoto et al.
(Continued)

FOREIGN PATENT DOCUMENTS

CN 1719860 1/2006
CN 101335808 12/2008
(Continued)

OTHER PUBLICATIONS

Tamura, "Computer Program Product", Ohmsha, 2002.
(Continued)

*Primary Examiner* — Menatoallah Youssef
(74) *Attorney, Agent, or Firm* — Amin, Turocy & Watson, LLP (57) ABSTRACT In an image processing system, an image processing apparatus configured to recognize images of documents is connected through a network to terminal apparatuses each including an input unit and a display unit. The image processing apparatus includes: a recognition unit configured to perform character recognition processing on an image; a confidential information detecting unit configured to detect confidential information from a result of the character recognition processing; and a manipulation unit configured to generate, based on the confidential information in the image, a first manipulated image obtained by fragmenting the confidential information. Each of the terminal apparatuses includes: a display unit configured to display the first
(Continued)

manipulated image; and an input unit configured to input corrected data for the first manipulated image.

11 Claims, 5 Drawing Sheets

(52) U.S. Cl.
CPC ......... *G06K 9/344* (2013.01); *G06K 9/00463* (2013.01); *G06K 9/2054* (2013.01); *G06K 2209/01* (2013.01)

(56) References Cited

U.S. PATENT DOCUMENTS

| | | | |
|---|---|---|---|
| 2008/0244378 A1 | 10/2008 | Chen et al. | |
| 2009/0003856 A1 | 1/2009 | Tanaka | |
| 2009/0201538 A1 | 8/2009 | Ishikawa et al. | |
| 2010/0067706 A1* | 3/2010 | Anan | G06F 21/608 380/285 |
| 2012/0265578 A1* | 10/2012 | Olding | G06Q 10/06 705/7.25 |
| 2016/0335415 A1* | 11/2016 | Jones | G06F 21/10 |
| 2017/0091544 A1* | 3/2017 | Adachi | G06F 21/6254 |

FOREIGN PATENT DOCUMENTS

| | | |
|---|---|---|
| CN | 101505347 | 8/2009 |
| JP | 2000-090195 | 3/2000 |
| JP | 2007-183985 | 7/2007 |
| JP | 2008-259156 | 10/2008 |

OTHER PUBLICATIONS

Tonouchi, et al. "A Hybrid Approach to Detect Texts in Natural Scenes by Integration of a Connected-Component Method and a Sliding-Window Method", IWRR2014, 2014.

Kurosawa, "Experiment and Investigation of Incremental Output Beam Search", IEICE Technical Report, PRMU2009-224, (Feb. 2010).

Suzuki, et al. "Flexible OCR Postprocessing by Matching Deterministic Finite Automation and Character Candidate Lattice", Toshiba review vol. 70, No. 4, 2015.

* cited by examiner

IMAGE A

| | |
|---|---|
| Member Number ⌐21 | 9876543210 ⌐22 |
| Full Name | Toshiba Taro |
| Telephone Number | 012-345-6789 |

FIG.5

CUTOUT IMAGE 1

| | |
|---|---|
| Member Number | 9876543210 |

CUTOUT IMAGE 2

| | |
|---|---|
| Full Name | Toshiba Taro |

CUTOUT IMAGE 3

| | |
|---|---|
| Telephone Number | 012-345-6789 |

IMAGE PROCESSING APPARATUS, IMAGE PROCESSING SYSTEM, COMPUTER PROGRAM PRODUCT, AND IMAGE PROCESSING METHOD

CROSS-REFERENCE TO RELATED APPLICATIONS

This application is based upon and claims the benefit of priority from Japanese Patent Application No. 2016-065759, filed on Mar. 29, 2016; the entire contents of which are incorporated herein by reference.

FIELD

Embodiments described herein relate generally to an image processing system, an image processing apparatus, an computer program product, and an image processing method.

BACKGROUND

There is a technique for reading ledger sheets by use of a character reading device such as an optical character reader (OCR) and converting characters entered therein into text data so that information entered in the ledger sheets that is represented by characters, images and the like can be stored in a database. In this case, a worker performs a step of manually checking and correcting the recognition result in order to handle false recognition.

In the above step, for example, the worker compares an image read out from a handwritten document and data read out by the character reading device while displaying the image and the data on a screen of a terminal apparatus for work, and corrects errors in the data read out by the character reading device.

DETAILED DESCRIPTION

When this step for handling false recognition is outsourced in the form of crowdsourcing or the like, the outsourcing is inconveniently largely restricted for compliance reasons such as personal information protection.

An embodiment described herein is directed to provide an image processing system, an image processing apparatus, and an image processing program that enable correction of characters recognized from documents such as ledger sheets while protecting the security of confidential information contained in the documents.

In the image processing system according to the embodiment, an image processing apparatus configured to recognize images of documents is connected through a network to terminal apparatuses each including an input unit and a display unit. The image processing apparatus includes: a recognition unit configured to perform character recognition processing on an image; a confidential information detecting unit configured to detect confidential information from the recognition result of the character recognition processing; and a manipulation unit configured to generate, based on the confidential information in the image, a first manipulated image obtained by fragmenting the confidential information. Each of the terminal apparatuses includes: a display unit configured to display the first manipulated image; and an input unit configured to input corrected data for the first manipulated image.

The following describes an example of the embodiment with reference to the drawings.

Figure 1:
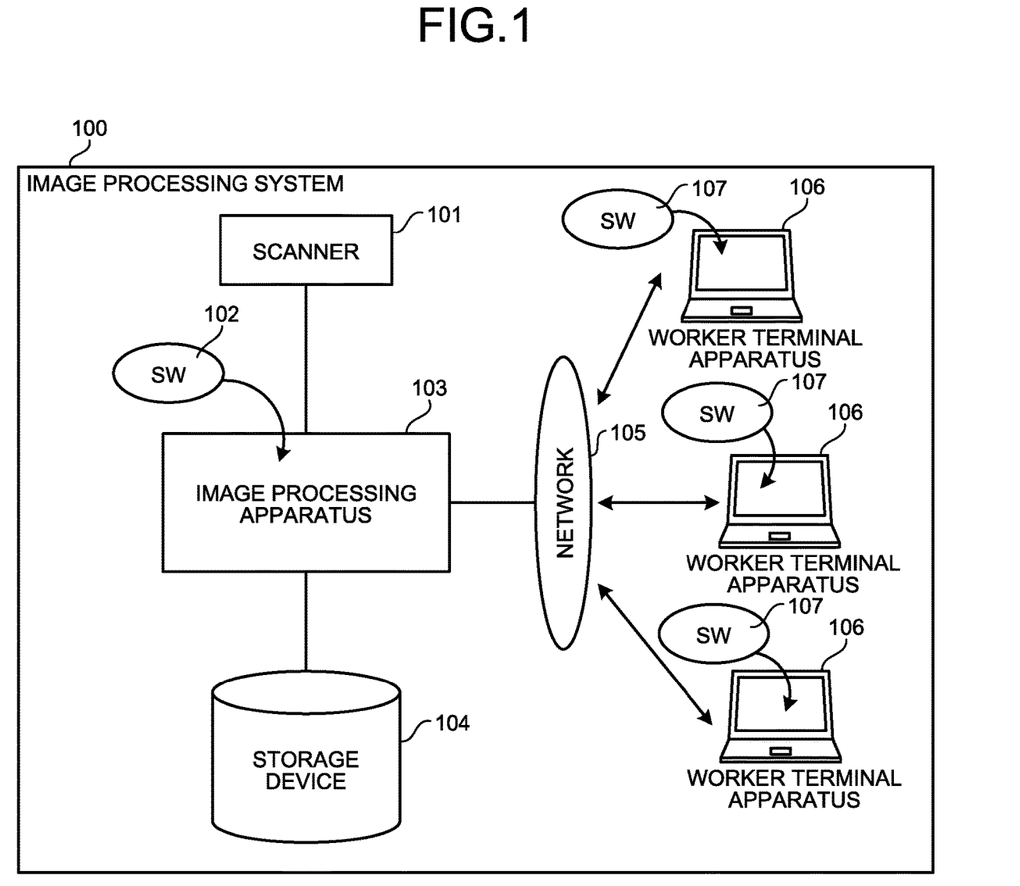
FIG. 1 is a schematic diagram illustrating the hardware configuration of an image processing system according to an embodiment.

The configuration of the image processing system according to this embodiment is described first with reference to FIG. 1. FIG. 1 is a block diagram illustrating the hardware configuration of an image processing system 100 according to this embodiment.

The image processing system 100 includes a scanner 101, a server apparatus 103 (hereinafter referred to as image processing apparatus) having software 102 installed thereon, a storage device 104 configured to store therein image data and results of processing performed by the image processing apparatus 103, worker terminal apparatuses 106 each having software 107 (for example, a web browser) installed thereon, and a network 105 connecting the image processing apparatus 103 to the worker terminal apparatuses 106.

"Connect" here does not necessarily mean to physically couple by wire or other means and means to bring into a state where data and signals are transmitted and received between connected components. That is, the image processing apparatus 103 and the worker terminal apparatus 106 can communicate with each other through the network 105. The image processing apparatus 103 does not need to be a single piece of equipment and may constitute one system by including a plurality of server apparatuses operating in cooperation with one another.

The scanner 101 reads out a document such as a ledger sheet on which the image processing apparatus 103 is to perform processing, and generates an image (document image) of the entire document or a part of the document. The scanner 101 inputs the generated image to the image processing apparatus 103. The image processing apparatus 103 stores the input image in the storage device 104. The image can be otherwise generated, for example, by being captured with a camera.

The software 102 implements various functions of the image processing apparatus 103. The software 102 also controls display on the worker terminal apparatus 106 by being operated through the software 107.

The image processing apparatus 103 recognizes an image and transmits the image recognition result to one of the worker terminal apparatuses. An image to be recognized in this embodiment is generated by the scanner 101 and is input to the image processing apparatus 103. The image processing apparatus 103 causes the storage device 104 to store therein the input image. The image processing apparatus 103 also causes the storage device 104 to store therein the image recognition result.

The storage device 104 is provided in the form of, for example, a hard disk drive. The storage device 104 stores therein images input to the image processing apparatus 103 and image recognition results obtained by the image processing apparatus 103. The storage device 104 has information previously stored therein that is needed for image processing to be performed by the image processing apparatus 103.

The worker terminal apparatus 106 is provided in the form of, for example, a personal computer, a mobile phone, a tablet computer, or a smartphone and includes a display unit configured to display thereon an image recognition result received from the image processing apparatus 103 and an input unit configured to input corrected data for the displayed image. That is, the worker can use the worker terminal apparatus 106 to perform correction processing on the image recognition result obtained by the image processing apparatus 103.

The image processing system 100 according to this embodiment is configured as described above, thereby enabling elimination of confidential information contained in an image. The image processing system 100 displays, on the worker terminal apparatus 106, an image from which confidential information has been eliminated, thereby enabling the worker to carry out correction work for an image recognition result that is displayed. That is, outsourcing correction work for an image recognition result is enabled without providing confidential information. The image processing system 100 also restores an original image from an image obtained by excluding confidential information therefrom, and thereby can reflect contents entered in correction work in a recognition result obtained by the image processing apparatus 103.

Figure 2:
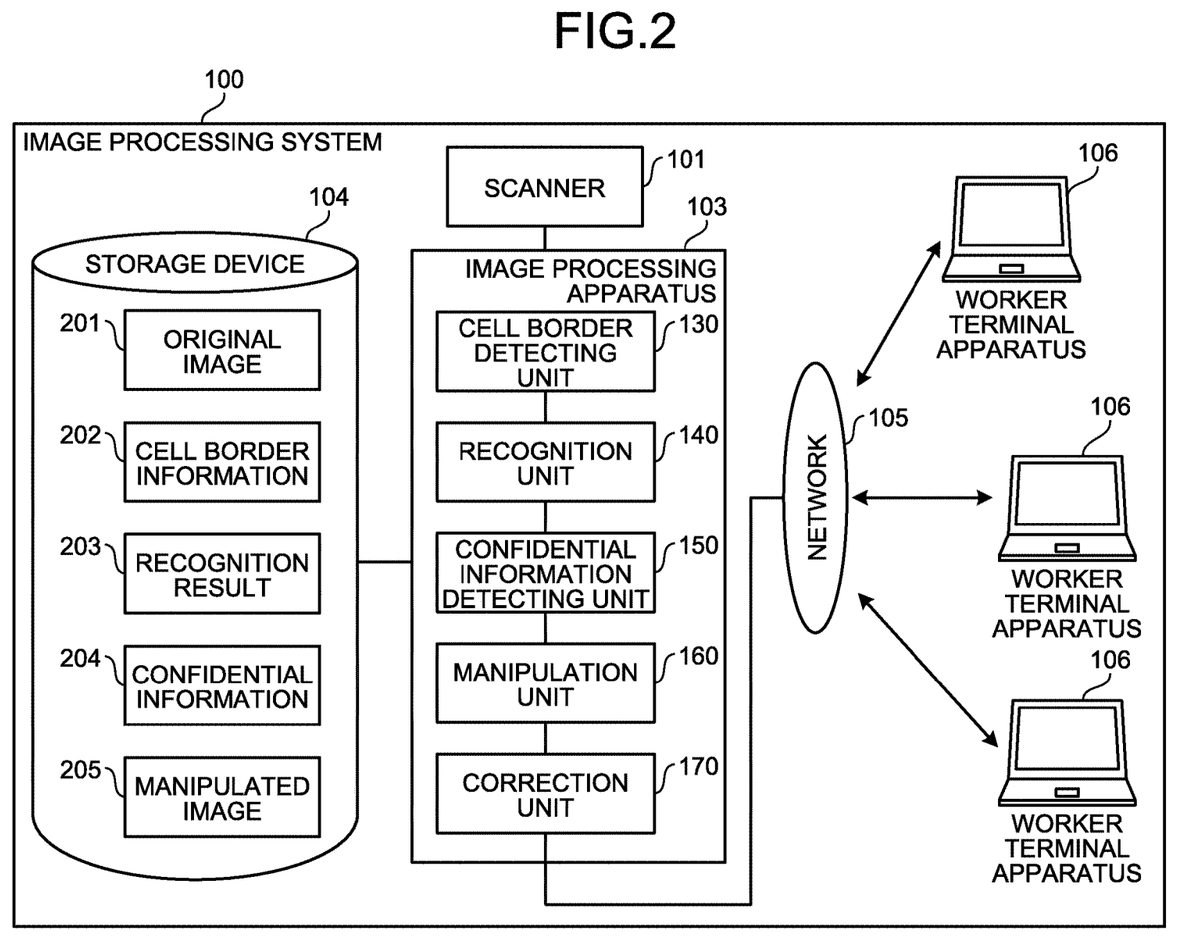
FIG. 2 is a block diagram illustrating an example of the functional configuration of the image processing system according to the embodiment.

Functions of the image processing system 100 are described with reference to FIG. 2. FIG. 2 illustrates an example of the functional configuration of the image processing system 100.

The image processing apparatus 103 includes a cell border detecting unit 130, a recognition unit 140, a confidential information detecting unit 150, a manipulation unit 160, and a correction unit 170 as illustrated in FIG. 2, and performs image processing on an image that is input thereto.

In this embodiment, an image data read out by the scanner 101 is previously stored in the storage device 104, and the image processing apparatus 103 performs image processing once an image (hereinafter original image) 201 stored in the storage device 104 is input thereto. Preprocessing such as binarization may be applied to the image as appropriate.

The cell border detecting unit 130 performs cell border detection processing on the original image 201 to detect one or more entry cells on a ledger sheet.

The cell border detecting unit 130 stores cell border information 202, which is information on the detected entry cells, in the storage device 104.

Cell borders defining entry cells are straight lines, and therefore can be detected using Hough transform. For example, straight lines each having a width and a length that are not less than previously determined thresholds are selected as cell border candidates, and cell borders are detected therefrom. It is considered that the an end point of a line segment constituting a cell border is on another cell border, and the straight lines thus detected may therefore be narrowed down to candidates of cell borders defining entry cells, the candidates having end points thereof on other straight lines.

When the structure of the ledger sheet is previously known, information on the entry cells may be previously set and stored as the cell border information 202 in the storage device 104.

Based on the cell border information 202, the recognition unit 140 generates one or more partial images (hereinafter referred to as cutout images) each cut out as one entry cell of the ledger sheet. In some cases, the recognition unit 140 generates the cutout images based on entry cells corrected by the correction unit 170.

The recognition unit 140 further performs character recognition on an image of the ledger sheet and the cutout images from the ledger sheet. That is, the recognition unit 140 detects characters from image data and recognizes the detected character strings.

Examples of a method for detecting a character string from an image include a method in which an object inside an entry cell detected by the cell border detecting unit 130 is treated as a character string. Alternatively, when the structure of the ledger sheet is previously known, the positions of character strings may be previously provided.

That is, the recognition unit 140 performs character recognition in each entry cell in an image based on the cell border information 202, and outputs a recognition result 203. The recognition result 203 includes cutout images, characters, and positional information on the characters. The recognition unit 140 may be configured to also output the reliability of the recognition result 203. The recognition unit 140 stores the recognition result 203 in the storage device 104.

The confidential information detecting unit 150 detects, in character information contained in the recognition result 203 output by the recognition unit 140, parts corresponding to information (hereinafter referred to as confidential information) 204 that needs to be kept confidential. The confidential information 204 is categorized into: information that can be determined to be so based on the contents of character strings, such as personal information including full names and addresses; and information that cannot be easily determined to be so based on the contents of character strings, such as personal identification numbers of some kinds.

When the structure of the ledger sheet is previously known, the confidential information detecting unit 150 can detect the confidential information 204 by having the positions of character strings of the confidential information 204 on the image previously set as knowledge. That is, the confidential information detecting unit 150 determines an object to be the confidential information 204 if the object fits in any one of the positions of character strings of the previously set confidential information 204 among character strings in the recognition result 203 obtained from the recognition unit 140.

When the structure of the ledger sheet is unknown, the confidential information detecting unit 150 detects the confidential information 204 based on character information contained in the recognition result 203. For example, the detection can be implemented in a manner such that: the names of items that constitute the confidential information 204 are previously registered as knowledge; and, if a character string contained in the recognition result 203 is found to be the same as any one of the names of items, the entered content corresponding to the item is determined to be the confidential information 204. The confidential information detecting unit 150 stores the detected confidential information 204 in the storage device 104.

When confidential information is detected, the manipulation unit 160 performs manipulation processing on a part in the cutout image corresponding to the confidential information based on the detected confidential information 204, thereby generating a manipulated image (first manipulated image) 205.

Exemplary types of manipulation processing performed on the parts corresponding to the confidential information by the manipulation unit 160 include: manipulation such as elimination, degradation, or mosaic obscuration on the parts that reduces the amount of information of the image; and changing the order of characters therein. That is, manipulation processing performed on the part in the manipulated image 205 is processing for fragmenting confidential information therein. While it is impossible to restore the confidential information from the individual manipulated images 205 without knowing specific processing performed by the manipulation unit, it is possible to restore the confidential information if necessary by combining the manipulated images 205 if the specific processing performed as the manipulation is known. A plurality of manipulated images 205 may be generated by the manipulation unit 160 depending on a method for fragmenting confidential information.

In one specific example of the manipulation processing, with respect to a character string that is an independently meaningless string of numbers and/or symbols such as a telephone number, the manipulation unit 160 generates a manipulated image having the characters rearranged in a randomly selected sequence. This manipulation makes it possible to prohibit a worker from accessing information on original character strings in correction processing in the correction unit 170 to be described later. At a provider of image data, corrected data that has been input by the worker is rearranged in accordance with the original sequence thereof, so that corrections provided to the provider can be correctly applied to the recognition result.

When no confidential information is detected, the manipulation unit 160 generates, based on the cell border information 202, a cell border image (second manipulated image) obtained by eliminating one or more parts other than the entry cells in the cutout image.

The manipulation unit 160 stores the generated first manipulated image and the generated second manipulated image as the manipulated images 205 in the storage device 104.

The correction unit 170 transmits, to the worker terminal apparatus 106, data (hereinafter, referred to as correction processing data) needed by a worker for correcting the recognition result 203. The transmitted correction processing data is displayed on the worker terminal apparatus 106, and the worker performs correction processing on the recognition result 203 through a displayed screen. The correction processing data transmitted to the worker terminal apparatus 106 is, for example, the manipulated image 205. As needed, not only the manipulated image 205 but also the cell border information 202 detected by the cell border detecting unit 130 and the recognition result 203 may be added in the correction processing data.

The worker inputs specific corrections (corrected data) for the manipulated image 205 with reference to the correction processing data displayed on the worker terminal apparatus 106. The input corrected data is input of characters displayed on the manipulated image 205. Otherwise, when the recognition result 203 is included as well as the manipulated image 205 in the correction processing data, true-false determinations with respect to characters and corrected characters are input.

When the manipulated image 205 is a cell border image, the input corrected data is true-false determination with respect to cell borders displayed and corrections for the cell borders.

The correction unit 170 receives the corrected data through the network 105 from the worker terminal apparatus 106. The correction unit 170 restores confidential information from the manipulated image 205 and the corrected data.

Figure 3:
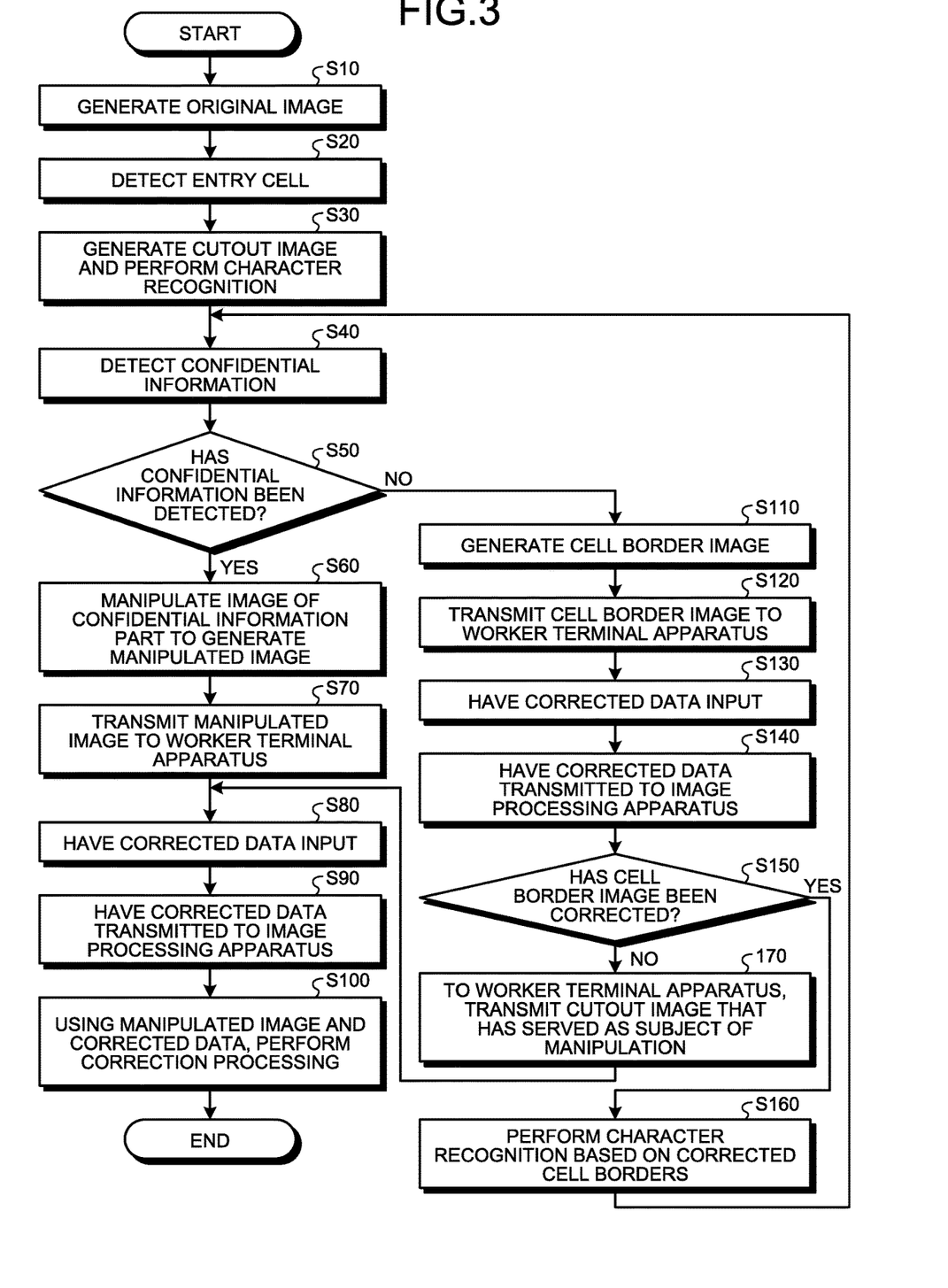
FIG. 3 is a flowchart illustrating an example of the operation of the image processing system according to the embodiment.

An example of the operation of the image processing system 100 according to this embodiment is described with reference to FIG. 3. FIG. 3 is a flowchart illustrating the example of the operation of the image processing system 100 according to the embodiment.

At the start, the scanner 101 generates image data by reading out a ledger sheet on which character recognition needs to be performed (Step S10).

Figure 4:
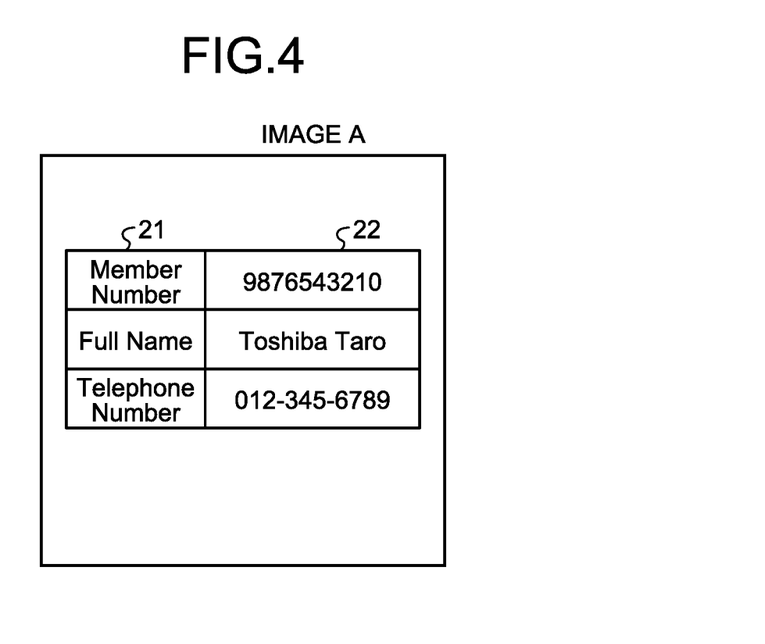
FIG. 4 is a diagram illustrating an example of an image in the image processing system according to the embodiment.

FIG. 4 illustrates an image A as an example of the original image 201. The image A is image data of a ledger sheet contains a table in which the left column contains item names 21 and the right column has entry fields 22 corresponding to the respective items and each having characters entered therein. The item name 21 in the first row in the image A is Member Number. The item name 21 in the second row in the image A is Full Name. The item name 21 in the third row in the image A is Telephone Number.

The image A is input to the image processing apparatus 103 and is stored as the original image 201 in the storage device 104 by the image processing apparatus 103.

The cell border detecting unit 130 in the image processing apparatus 103 performs the cell border detection processing on the original image 201 in the storage device 104 to detect entry cells on the ledger sheet (Step S20).

The cell border detecting unit 130 stores cell border information 202 in the storage device 104, the cell border information 202 containing, with respect to each of the detected entry cells, positional information on the entry cell in the original image 201.

The recognition unit 140 generates a cutout image with respect to each of the detected entry cells, and performs character recognition processing on the generated cutout images (Step S30). The recognition unit 140 stores the recognition result 203 in the storage device 104.

Figure 5:
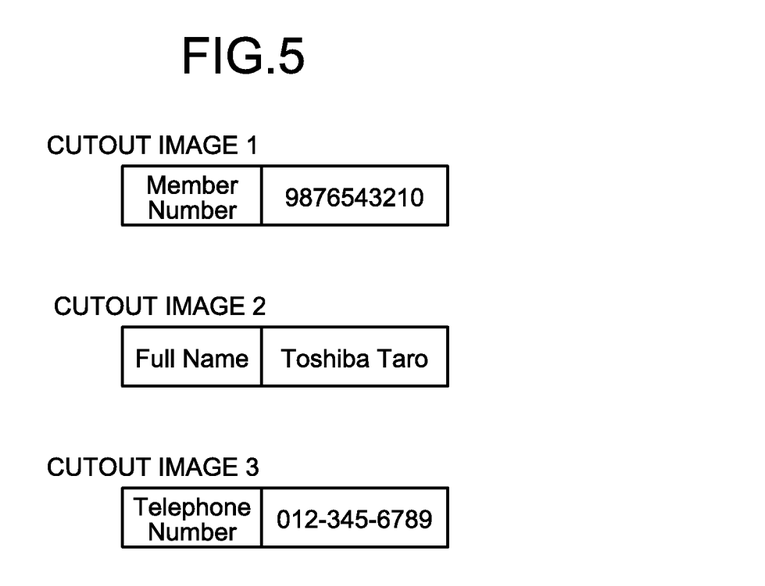
FIG. 5 is a diagram illustrating an example of images in the image processing system according to the embodiment.

FIG. 5 illustrates an example of the cutout images in this embodiment. FIG. 5 illustrates the cutout images generated from the image A. As illustrated in FIG. 5, the three cutout images that are cutout images 1 to 3 are generated from the image A.

The confidential information detecting unit 150 detects confidential information 204 such as personal information from characters contained in the recognition result 203 (Step S40). The confidential information detecting unit 150 stores the detected confidential information 204 in the storage device 104.

When the confidential information 204 is detected (Yes at Step S50), the manipulation unit 160 manipulates, based on the detected confidential information 204, the cutout image or images that have the confidential information 204 detected therefrom (Step S60). That is, the manipulation unit 160 generates a manipulated image 205 (also referred to as first manipulated image) in which a part corresponding to the confidential information in the cutout image that has the confidential information 204 detected therefrom has been manipulated. The manipulation unit 160 stores the manipulated image 205 in the storage device 104.

Figure 6:
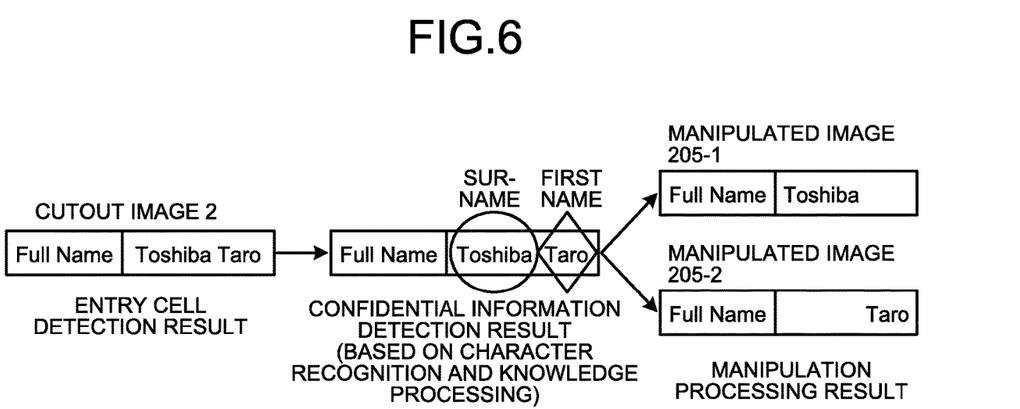
FIG. 6 is a schematic diagram illustrating examples of confidential information detection processing and manipulation processing in the image processing system according to the embodiment.

The confidential information detection processing that the confidential information detecting unit 150 performs on the cutout image 2 and the manipulation processing that the manipulation unit 160 performs thereon are described with reference to FIG. 6. FIG. 6 is a schematic diagram illustrating the confidential information detection processing and the manipulation processing that are performed on the cutout image 2 according to this embodiment.

As illustrated in FIG. 6, when the confidential information detection processing is performed on the cutout image 2 at Step S40, two objects "Toshiba" and "Taro" are detected as the confidential information 204 based on the characters contained in the recognition result 203 and knowledge regarding confidential information.

Based on this detection result of confidential information, the manipulation unit 160 performs the manipulation processing on the cutout image 2, thereby generating a manipulated image 205. In this case, the manipulation unit 160 performs manipulation such that, while one of the detected two pieces "Surname" and "Name" of confidential information 204 is left as it is, the other one is deleted. Consequently, a manipulated image 205-1 and a manipulated image 205-2 are generated.

The description refers back to FIG. 3. The correction unit 170 transmits, to the worker terminal apparatus 106, correction processing data that contains the manipulated image 205 obtained by manipulating a part corresponding to the confidential information therein (Step S70). The correction processing data that the correction unit 170 transmits may contain not only the manipulated image 205 but also the cell border information 202 and the recognition result 203 as needed. The confidential information 204 contained in the recognition result 203 at this time has been obscured by being subjected to processing similar to the manipulation to which the manipulated image 205 has been subjected.

The worker terminal apparatus 106 displays, to the worker, the received correction processing data containing the manipulated image 205. Based on the manipulated image 205 displayed, the worker inputs corrected data to the worker terminal apparatus 106 (Step S80). When there are a plurality of such manipulated images 205 that are supposed to follow a certain rule, such as having the same content, those manipulated images may be displayed at the same time in a superimposed manner or side by side. For example, when the manipulated images 205 that have the same recognition result for an item the entered contents of which are limited to a small number of alternatives, such as the gender, are displayed at the same time in a superimposed manner or side by side, a small number of manipulated images 205 that involve false recognition can be efficiently found.

The worker terminal apparatus 106 transmits the corrected data input by the worker to the image processing apparatus 103 (Step S90). The correction unit 170 performs correction processing on the recognition result 203 based on the received corrected data and the manipulated image 205 (Step S100). For example, the correction unit 170 compares the manipulated images 205, thereby restoring the cutout image from the manipulated images 205 and restoring the confidential information for the corrected data. Using the corrected data that has the confidential information restored, the correction unit 170 corrects the recognition result 203 with respect to the cutout images. This correction is performed, for example, in such a manner that, when different characters have been found as a result of comparing characters in the corrected data with those in the recognition result 203, those different characters and an image corresponding thereto are displayed on the worker terminal apparatus 106 to cause the worker to select one of the different characters.

When no confidential information 204 is detected from the recognition result 203 (No at Step S50), the manipulation unit 160 generates a cell border image (second manipulated image) by applying manipulation processing to parts other than the entry cells that have been detected by the cell border detecting unit 130 in the cutout images (Step S110). That is, the manipulation unit 160 performs manipulation such as elimination, degradation, or alteration on parts other than the entry cells in the cutout images.

Figure 7:
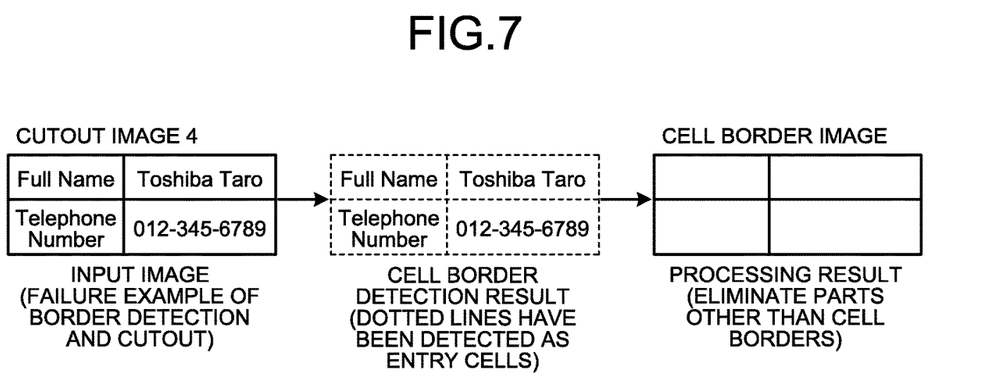
FIG. 7 is a schematic diagram illustrating an example of a cell border image in the image processing system according to the embodiment.

FIG. 7 illustrates a conceptual diagram of the process of generating a cell border image according to this embodiment. FIG. 7 is a schematic diagram illustrating an example of a cell border image.

A cutout image 4 in the left side of FIG. 7 is one example of partial image data that has been cut out of the image A by the cell border detecting unit 130. The part indicated in a dotted line is detected as entry cells from this cutout image 4. There has been false detection of entry cells, and two entry cells have been detected as one entry cell. Suppose that the confidential information detection processing performed thereon has resulted in detection of no confidential information 204 for that reason. In this case, the manipulation unit 160 detects pixels other than the entry cells in the cutout image 4 and deletes the detected pixels. The manipulation unit 160 thereby generates a cell border image.

The correction unit 170 transmits the cell border image to the worker terminal apparatus 106 (Step S120).

The worker terminal apparatus 106 displays the received cell border image. The worker checks the cell border image displayed, and determines whether cell borders detected as entry cells need to be corrected. That is, when the entry cells need to be corrected, the worker corrects the cell borders and inputs the corrected cell borders to the worker terminal apparatus 106 (Step S130). For example, cell borders can be corrected in a manner such that, when the worker selects a cell border that the worker thinks is incorrect from among cell borders on the cell border image displayed on the worker terminal apparatus 106, the correction unit 170 deletes the selected cell border.

The worker terminal apparatus 106 transmits corrected data of cell borders to the image processing apparatus 103 (Step S140).

Upon receiving the corrected data for the cell border image, the correction unit 170 determines whether the cell border image has been corrected (Step S150). If the cell border image has been corrected (Yes at Step S150), the recognition unit 140 generates cutout images based on the corrected cell borders and performs character recognition (Step S160). Thereafter, the operation returns to Step S40, and the confidential information detecting unit 150 detects confidential information from the recognition result 203. Thus, the character recognition is performed based on correct entry cells, which makes it possible to detect confidential information with high accuracy.

If the cell border image has not been corrected (No at Step S150), that is, if entry cells have been correctly detected with the recognition result 203 including no confidential information 204, the correction unit 170 transmits, to the worker terminal apparatus 106, the cutout image that has served as subject of manipulation to generate this cell border image (Step S170). Based on the cutout images displayed on the worker terminal apparatus 106, the worker carries out processing at Step S80 and subsequent steps to correct the recognition result.

As described above, without providing an outsourcing contractor with images containing information that needs to be kept confidential such as personal information, the image processing system 100 according to this embodiment enables the outsourcing contractor to perform correction work on character recognition results.

For example, when a plurality of manipulated images 205 are detected from one cutout image after confidential information 204 is detected, correction of personal information can be outsourced in a manner such that: the image processing apparatus 103 makes preparation such that an original image of the manipulated images can be restored by comparison among the manipulated images; and, thereafter, the respective manipulated images are provided to different workers.

When no confidential information 204 has been detected by the confidential information detecting unit 150, an error may possibly have occurred when the cell border detecting unit 130 has detected cell borders in the original image 201. In that case, the manipulation unit 160 generates an image obtained by eliminating elements other than cell borders in the cutout image from which confidential information has been supposed to be detected. The generated image is transmitted to the worker terminal apparatus 106 by the correction unit 170 and presented to a worker. When the worker selects correct cell borders based on the presented image, a character recognition unit 140 performs character recognition again based on the selected cell borders.

Thus, the image processing system 100 according to this embodiment is enabled to prevent images that contain confidential information from being provided to an outsourcing contractor. That is, a failure to correctly detect confidential information due to a failure to correctly detect cell borders can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, with respect to a character string that is an independently meaningless string of numbers and/or symbols such as a telephone number in the original image 201, the manipulation unit 160 may be configured to output one manipulated image having the characters rearranged in a randomly selected sequence. The manipulation unit 160 can alternatively be configured to output two manipulated images, that is, a manipulated image obtained by eliminating only odd-numbered characters and another manipulated image obtained by eliminating only even-numbered characters.

Thus, without providing information on the original character string to a worker who performs correction processing, a provider of image data can rearrange corrected input into an original sequence and therefore can correctly correct the recognition result.

Another possible example of processing to be performed by the manipulation unit 160 is processing such that, when a plurality of pieces of image data corresponding to ledger sheets having the same format and having different contents entered thereon are available as original images, a plurality of manipulated images are output that are obtained from the respective original images by replacing parts of pieces of confidential information detected therein with one another. The parts of the pieces of confidential information to be replaced are present at the same position in the respective original images.

For example, when full names are detected as confidential information from two respective original images, the manipulation unit 160 deletes the part of the first name of the full name contained in a first one of the original images and replaces the first name of the full name contained in a second one of the original images with the deleted first name. Similarly, the manipulation unit 160 deletes the first name of the full name contained in the second original image and replaces the first name of the full name contained in the first original image with the deleted first name.

What is claimed is:

1. An image processing apparatus comprising:
a memory; and
one or more processors configured to function as a recognition unit, a confidential information detecting unit, a manipulation unit and a correction unit, wherein
the recognition unit performs character recognition processing on an original image of a document;
the confidential information detecting unit detects confidential information from a result of the character recognition processing;
the manipulation unit generates, based on the confidential information, a first manipulated image obtained by fragmenting the confidential information in the original image; and
the fragmenting by the manipulation unit is performed such that it is possible to restore the confidential information using the first manipulated image without using other information on the original image if processing performed as the fragmenting is known, and the first manipulated image allows a worker to correct a character representing at least part of the confidential information included in a result of character recognition of the recognition unit.

2. The image processing apparatus according to claim 1, wherein:
the one or more processors are configured to further function as a detection unit,
the detection unit detects an entry cell from the original image, wherein
the recognition unit generates a partial image cut out from the original image based on the entry cell, and performs the character recognition processing on the partial image, and
when the confidential information detecting unit detects no confidential information from the result of the character recognition processing, the manipulation unit generates a second manipulated image by eliminating other parts rather than the entry cell in the partial image.

3. The image processing apparatus according to claim 1, wherein:
the correction unit transmits manipulated images to a terminal apparatus and receives corrected data for the manipulated images input by the input unit.

4. The image processing apparatus according to claim 1, wherein the correction unit restores a part fragmented by the manipulation unit to a state before fragmentation.

5. The image processing apparatus according to claim 1, wherein the fragmenting by the manipulation unit is a manipulation that reduces an amount of information of an image or a change of an order of characters.

6. The image processing apparatus according to claim 1, wherein the fragmenting is performed by changing order of characters in the confidential information.

7. The image processing system comprising:
the image processing apparatus according to claim 1; and
a terminal apparatus,
the image processing apparatus and the terminal apparatus being connected to each other through a network, wherein
the terminal apparatus comprises
a display unit configured to display thereon the first manipulated image, and
an input unit configured to input corrected data for the first manipulated image.

8. The image processing system according to claim 7, wherein
the one or more processors are configured to further function as
a detection unit configured to detect an entry cell from the original image,
the recognition unit generates a partial image cut out from the original image based on the entry cell, and performs the character recognition processing on the partial image,
when the confidential information detecting unit detects no confidential information from the result of the character recognition processing, the manipulation unit generates a second manipulated image by eliminating other parts rather than the entry cell in the partial image,
the display unit displays thereon the second manipulated image,
the input unit inputs corrected data for the second manipulated image, and
when the entry cell in the second manipulated image is corrected, the recognition unit performs the character recognition processing based on the corrected entry cell.

9. The image processing system according to claim 7, wherein
the first manipulated image comprises a plurality of first manipulated images;
the fragmenting by the manipulation unit is a manipulation that reduces an amount of information of an image such that it is possible to restore the confidential information by combining the plurality of first manipulated images,
the display unit displays thereon, as the first manipulated image, one of the plurality of first manipulated images,
the input unit inputs corrected data for the one of the plurality of first manipulated images, as the first manipulated image.

10. A computer program product having a non-transitory computer readable medium including programmed instructions, wherein the instructions, when executed by one or more computers, cause the computer to perform:
performing character recognition processing on an original image;
detecting confidential information from a result of the character recognition processing; and
generating, based on the confidential information, a first manipulated image obtained by fragmenting the confidential information in the original image, the fragmenting being performed such that it is possible to restore the confidential information using the first manipulated image without using other information on the original image if processing performed as the fragmenting is known, and the first manipulated image allows a worker to correct a character representing at least part of the confidential information included in a result of character recognition of the recognition unit.

11. An image processing method employed in an image processing apparatus, the image processing method comprising:
performing, by a recognition unit, character recognition processing on an original image;
detecting, by a confidential information detecting unit, confidential information from a result of the character recognition processing; and
generating, by a manipulation unit, based on the confidential information, a first manipulated image obtained by fragmenting the confidential information in the original image, the fragmenting being performed such that it is possible to restore the confidential information using the first manipulated image without using other information on the original image if processing performed as the fragmenting is known, and the first manipulated image allows a worker to correct a character representing at least part of the confidential information included in a result of character recognition of the recognition unit.

* * * * *